United States Patent [19]

Keigler et al.

[11] Patent Number: 4,599,619

[45] Date of Patent: Jul. 8, 1986

[54] SATELLITE DUAL ANTENNA POINTING SYSTEM

[75] Inventors: John E. Keigler, Princeton; Frank A. Hartshorne, Cinnaminson, both of N.J.

[73] Assignee: RCA Corporation, Princeton, N.J.

[21] Appl. No.: 397,893

[22] Filed: Jul. 13, 1982

[51] Int. Cl.[4] .......................................... H04B 7/185
[52] U.S. Cl. .................................. 343/352; 343/354; 343/358; 343/359
[58] Field of Search ............... 343/352, 354, 355, 356, 343/357, 358, 359

[56] References Cited

U.S. PATENT DOCUMENTS

| | | | |
|---|---|---|---|
| 3,534,364 | 10/1970 | Burford | 343/353 |
| 3,541,553 | 11/1970 | Gubin | 343/353 |
| 3,710,255 | 1/1973 | Gicca | 343/352 X |
| 3,757,336 | 9/1973 | Rosen | 343/354 |
| 3,772,701 | 11/1973 | Wilkinson | 343/359 X |
| 3,774,207 | 11/1973 | Yaplee et al. | 343/7.4 |
| 3,806,932 | 4/1974 | Dietrich et al. | 343/374 |
| 3,821,738 | 6/1974 | Quesinberry et al. | 343/744 |
| 3,928,804 | 12/1975 | Schmidt et al. | 343/354 X |
| 4,181,886 | 1/1980 | Cooperman | 343/352 X |
| 4,315,262 | 2/1982 | Acampora et al. | 343/352 |
| 4,355,313 | 10/1982 | Hubert | 343/352 X |

OTHER PUBLICATIONS

"Spectral Reuse in 12 GHz Satellite Communication Systems", by D. O. Reudink et al. in IEEE Conference Record ICC77, Jun. 12-15, 1977, Chicago, Ill., vol. 3 at pp. 37.5-32 to 37.5-35.

Brown, Irving, "Satellite Communications System" filed Feb. 26, 1982, Ser. No. 352,882.

*Primary Examiner*—Theodore M. Blum
*Assistant Examiner*—John B. Sotomayor
*Attorney, Agent, or Firm*—Joseph L. Tripoli; Robert L. Troike

[57] ABSTRACT

A satellite antenna pointing system for separately pointing separated transmit and receive high gain antenna systems includes means for separately and sequentially applying a beacon signal to the transmit and receive antenna systems and a broad beam width antenna which has a coverage area greater than the overall coverage region of the spot beam antenna systems. The system includes ground stations located at or near the periphery of the overall coverage region adapted to receive these beacon signals. At a central control station these beacon signals are compared to provide first signals proportional to the ratio of said beacon signals received from said transmit antenna system and said broad beam width antenna and second signals proportional to the ratio of said beacon signals received from said satellite receive antenna system and said broad beam width antenna. The central station generates from said first signals transmit antenna control signals which are sent to the satellite to control the orientation of said transmit antenna system. Likewise, the central control station generates from the second signals receiver antenna control signals which are applied to the satellite to control the orientation of the satellite receive antenna system.

14 Claims, 5 Drawing Figures

SATELLITE DUAL ANTENNA POINTING SYSTEM

The invention described herein was made in the performance of work under a NASA contract and is subject to the provisions of Section 305 of the National Aeronautics and Space Act of 1958, Public Law 85568 (72 Stat. 42 U.S.C. 2457).

This invention relates to a satellite antenna pointing system and more particularly to an antenna pointing system like that described in copending application Ser. No. 352,882, filed Feb. 26, 1982 of I. Brown entitled "SATELLITE COMMUNICATION SYSTEM". According to one embodiment of this Brown application pointing errors are minimized by comparing the received signals at ground stations located near the periphery of the desired beam and changing the position of the satellite antenna to compensate for these errors.

Various systems have been proposed heretofore which employ orbiting satellites as relay stations in the transmission of radio signals from one point to another on earth. The most practical and low cost method of achieving communication satellites is to place these communication satellites in a geosynchronous orbit at about 22,300 miles from the earth's surface and above the earth's equator so that the orbit time approximates that of the earth's rotation and the satellite appears stationary from the earth and hovering over a given region. By various means such as use of a momentum wheel(s) and an exchange of momentum, a platform containing an antenna can be positioned so that the antenna continuously faces the earth and a desired coverage region.

In geosynchronous communication satellites, weight and power limitations dictate that the satellite antenna coverage pattern be shaped and pointed to fit as closely as possible to the predetermined area of the earth's surface which is to be served by this satellite. In orbit, disturbances or distortions which change the pattern shape or move it away from the desired location should either be minimized by design, if possible, and/or compensated by in-flight corrections. A less desirable alternative is to modify the antenna design to enlarge its pattern to take into account the effects of all these factors; but this reduces the peak gain, the loss of which must be made up by increasing the satellite power output and correspondingly satellite weight.

In the higher communications frequency bands, it is generally desirable to provide increased antenna gain in order to offset the increased path loss. When the gain is increased, the gain gradient at the edge of the beam magnifies all of the in orbit disturbances or distortions which change the pattern shape or move it away from the desired location.

Satellites operating in the 30/20 gigahertz (GHz) frequency region are presently being considered. Communication satellites at these frequencies would be highly susceptible to the pointing errors and basically require some method for improving the pointing accuracy of the antenna. It is planned that communication at these frequencies would consist of providing spot beams whereby the satellite would receive signals from one local region of, for example, the United States and transmit a spot beam to another local region, with the spot beams being approximately 0.4 degrees beam width. The transmit and receive antennas to be pointed will provide the spot beam (approximately 0.4 degrees) coverage of selected ground sites. Pointing of the antennas is thus required within an accuracy of about ±0.05, degrees i.e., approximately one tenth of the beam width. As conceived, the transmit and receive antennas for these future satellites would be separated by at least 12 feet. Pointing of only one antenna, transmit or receive, by means of orienting the overall spacecraft using the attitude determination control subsystem would result in incorrect pointing of the other antenna due to mechanical and thermal distortions in the antenna structure and reflector. Separate pointing of the receive and transmit antennas (and thus the spot beams) is necessary because of the large antenna structures required for both transmit and receive reflectors.

Disadvantages of the monopulse approach of solving this problem would include (1) the need for onboard signal detection and processing plus a ground station beacon transmitter, and (2) susceptibility to beam distortions that move the tracking null with respect to the beam of interest.

According to one embodiment of the present invention an improved satellite pointing system is achieved by applying a satellite-generated beacon signal to the spatially separated satellite transmitter and receiver spot beam antenna systems and to a broad coverage radiating antenna which radiates over the coverage area of all of the spot beams. A plurality of ground stations located at or near the periphery of the broad beam receive both the spot beams and the broad beam to produce ratio signals which are used to determine the individual pointing errors of the satellite transmit and receive antennas and so generate control signals for adjusting separately the transmit and receive antenna pointing. The satellite includes means for independently pointing the transmit and receive antennas in response to the control signals.

Figure 1:
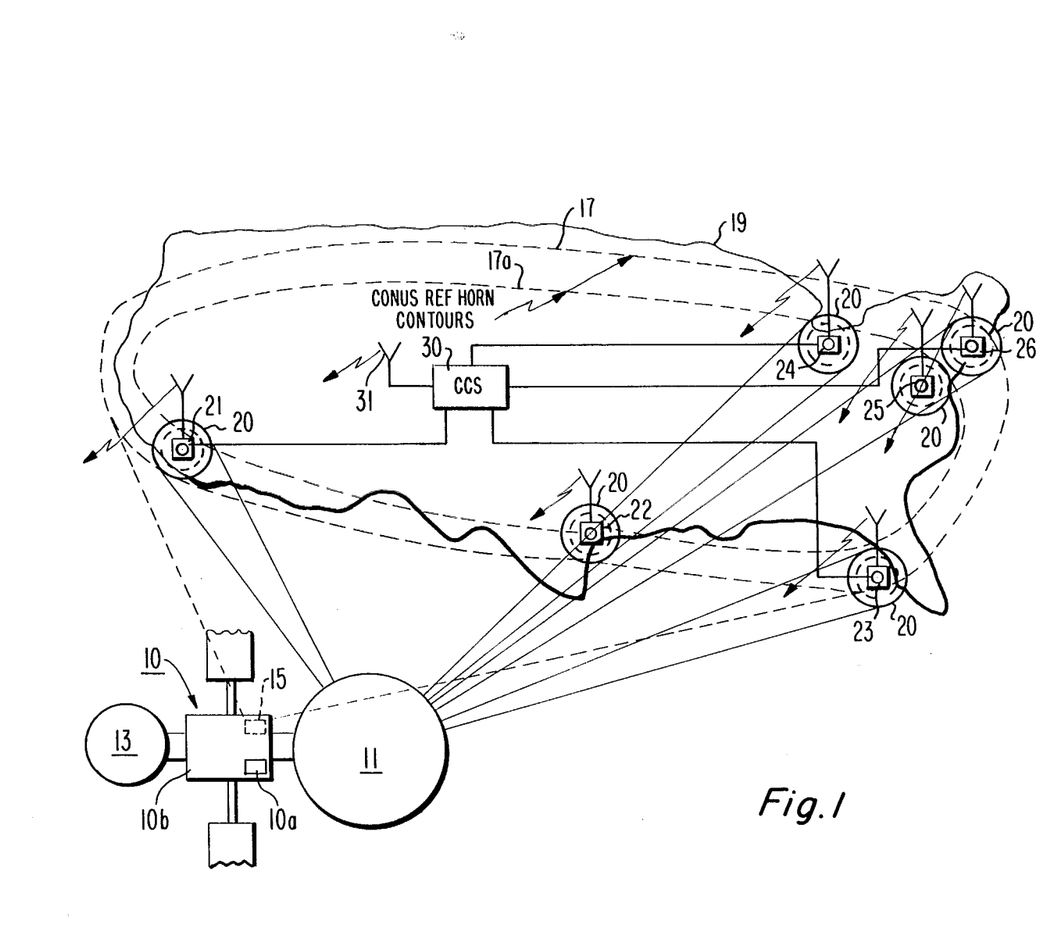
FIG. 1 is a functional sketch of a satellite orbiting the earth and providing spot beam coverage of the United States, for example, in accordance with one preferred embodiment of the present invention.

Referring to FIG. 1 there is illustrated by way of example a functional sketch of a satellite 10 orbiting the earth (only continental U.S. shown), for example, above the equator and 22,300 miles above the earth's surface so as to be in the geostationary orbit. By means of exchange of momentum with the momentum wheel 10a, for example, the satellite body 10b is positioned so that its transmit antenna system 11 and receive antenna system 13 are always pointed toward the United States. The satellite transmit antenna 11 as shown in detail of FIG. 2 may include a large parabolic reflector 11a, a sub-reflector 11b and a plurality of radiator horns 11c. The satellite receive antenna system 13 may also include a large parabolic reflector 13a, a sub-reflector 13b and a plurality of horns 13c. In addition, the satellite 10 includes for example, a horn radiator 15, as part of this invention which produces a CONUS (continental United States) beam pattern indicated by dashed line 17, FIG. 1. The CONUS horn antenna 15 produces the pattern 17 such that a substantially complete coverage of the continental United States outline results as represented by a line 19. This CONUS coverage is approximately 3° by 5°. The transmit and receive antenna systems 11 and 13 when excited at the horns produce relatively narrow spot beams each of about 0.4° beam width. A few of these spot beams are indicated by the circles 20. The spot beams shown are for the selected ground stations for Los Angeles (station 21), Houston Texas (station 22), Tampa (station 23), Cleveland (station 24), Washington D.C. (station 25) and New York (station 26). The position of the feed horns 11c or 13c relative to the reflectors 11a and 11b or 13a and 13b, respectively, would be such as to produce spot beams for all of the desired communication ground stations. The subject application is an extension of a previously described system of Irving Brown, assigned to RCA Corporation, entitled "SATELLITE COMMUNICATION SYSTEM", RCA 77,217 filed Feb. 26, 1982 and Ser. No. 352,882. In this prior art system, a CONUS communication beam is transmitted to ground stations at sites near the periphery of the coverage region where it is compared with a broader than CONUS horn radiator pattern from a beacon source to derive any changes in the beam pattern from that desired and such errors are then communicated back to the satellite to change the attitude of the satellite to reposition the transmit antenna to provide the desired CONUS coverage.

In accordance with this invention for spatially separated transmit and receive antennas, the transmitted communication signals are radiated as spot beams to selected ground sites rather than to a broad coverage region. Beacon signals are sent via the communication antennas and are received at certain selected ground sites which are near the periphery of the coverage region. These beacon signals are compared at the ground stations to a received CONUS beacon signal beam transmitted from the satellite horn antenna to detect any antenna error and such error signals are used to provide control signals to the satellite to reposition the antennas. The selected ground stations are, for example, the Los Angeles station 21, the Cleveland station 24, the Tampa station 23 and the New York station 26. The principle involved is a measurement of the ratio between received spot beam signals from the receive and transmit spot beams antenna systems at each of these four selected ground stations and the received signals from the reference CONUS horn antenna 15. The antenna positioning errors detected by comparing the received signals at the four selected ground stations are used to derive errors in the spot beams by an estimation algorithm. Pointing corrections are calculated and sent as offset biases and times for an on-board computer program stored in the satellite attitude control system. The four selected ground stations 21, 23, 24 and 26 will measure the ratio between the signals transmitted sequentially via the CONUS horn 15 and the communications transmit antenna system 11. These same four selected ground stations 21, 23, 24 and 26 will also measure the ratio between the signals transmitted sequentially via the CONUS horn and the communications receive antenna by switching the beacon signal from the transmitter antenna system 11 to the receiver antenna system 13.

Figure 3:
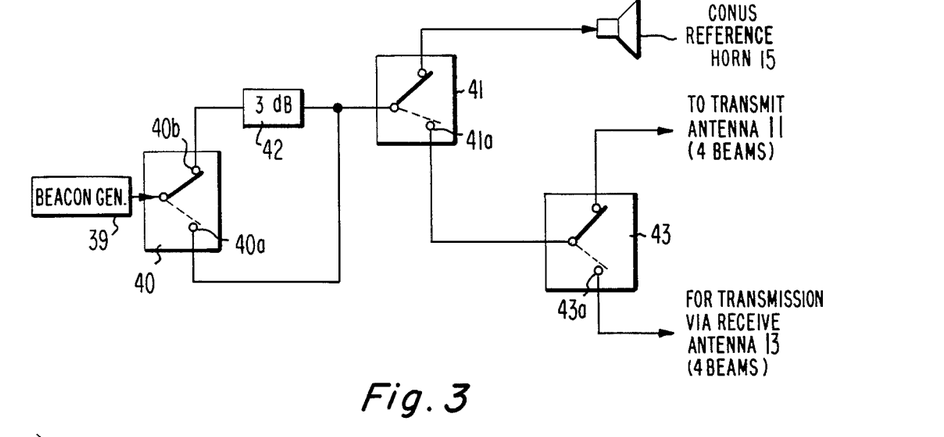
FIG. 3 is a simplified diagram of the beam switching-/calibrate unit.

Referring to FIG. 3 there is illustrated a simple functional block diagram of the beam switching and calibrate unit on the satellite 10. On the satellite 10 a beacon generator 39 will generate a beacon signal close to the transmit communications frequencies via switches 40 and 41 to the CONUS beam horn 15 and then sequentially via switch 40 in a second position via terminal 40b as shown through a 3 db attenuator 42 to the CONUS horn 15. The beacon signal via the 3 db calibrate attenuator 42 to the CONUS horn 15 produces theoretically the pattern illustrated by dashed line 17a in FIG. 1. The "calibrate sequence" via attenuator 42 permits calculation of a conversion constant that converts a measured voltage difference on the ground to a known 3 db change in the spacecraft EIRP. Alternately, this 3 dB calibrate feature can be incorporated in the receive stations. A short time thereafter the switch 40 is returned to contact terminal 40a (indicated by dashed line) and switch 41 to contact terminal 41a (indicated by dashed line) and the beacon signal is applied to the satellite transmitter antenna system 11 via switches 40, 41 and 43 whereupon the same beacon signal would be radiated as four spot beams 20 to the trunking ground stations 21, 23, 24 and 26. At these ground stations 21, 23, 24 and 26 these four spot beams 20 will be received as well as the CONUS beacon signal from horn 15 and the data or processed version of the same is sent via land lines for example to the central control station 30. At the central control station 30 the data received will be processed according to an estimation algorithm (that includes spacecraft antenna pattern information) to determine roll and pitch (attitude motion information) relative to the spacecraft transmit antenna 11. This information is then compared to determine errors in the desired pattern to determine if there are offset error values in the roll and pitch directions and any correction signals are derived therefrom and are transmitted to the spacecraft via the central control station antenna 31 at a command frequency as part of the telemetry and control system commands to the spacecraft 10.

Figure 2:
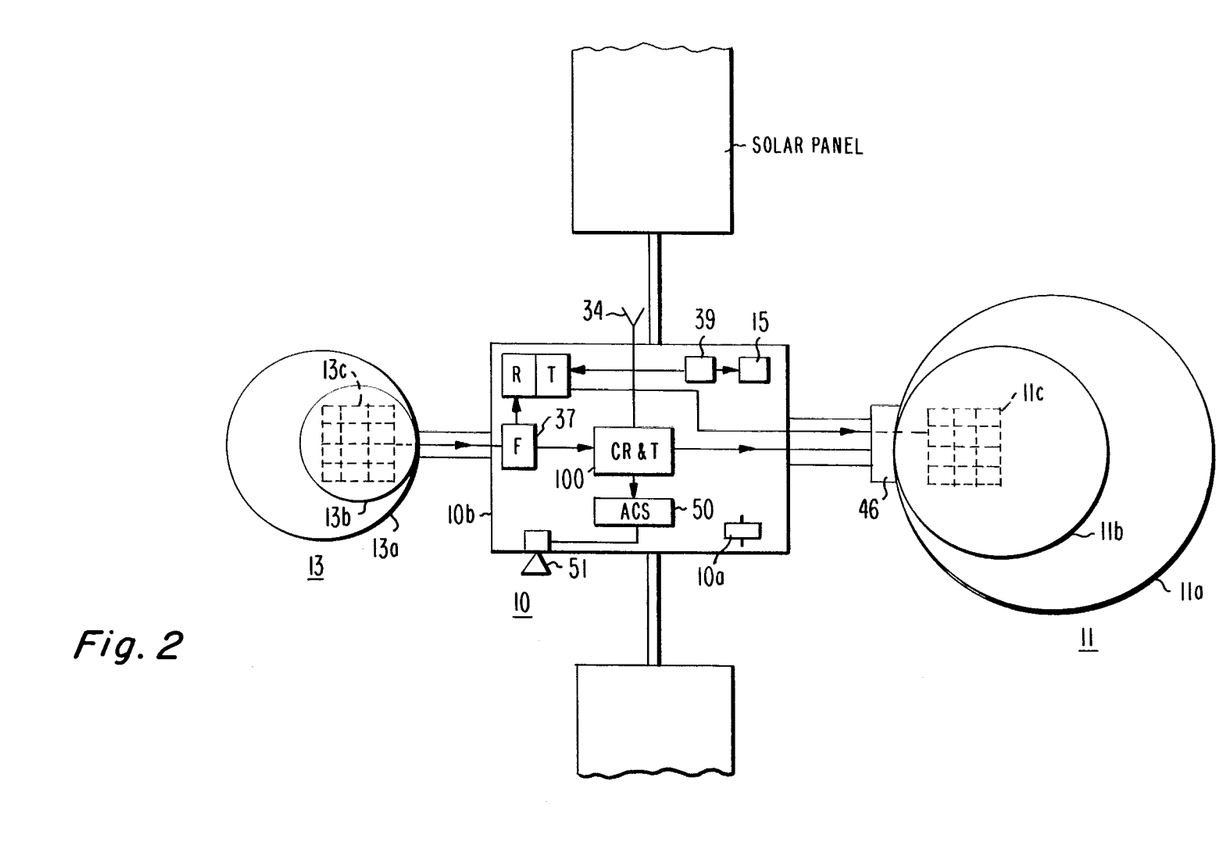
FIG. 2 is a more detailed functional sketch of the satellite system of FIG. 1.

The correction signals radiated from central control station antenna 31 are received by either the receive antenna system 13 of the spacecraft or an omni antenna 34, see FIG. 2. The correction signals are detected at the command receiver CR&T 100. The command receiver (CR&T) 100 is tuned to a command frequency near the receive frequency, for example. The command receiver 100 input is connected to both the horns 13c for antenna system 13 and to the omni antenna 34 (also called command and telemetry antenna) and they receive correction signal commands via either path. Correction signals which are detected at the command receiver 100 by means of, for example, the filter 37 and receive antenna 13 indicative of the attitude errors of the transmit antenna system of the satellite are coupled from the CR&T receiver 100 to transmit antenna reflectors 11a and 11b pitch and roll step motors 46 to correct for pointing errors of the satellite transmit antenna system 11. Yaw attitude corrections are not included as yaw attitude errors have a small effect. The position of the receive antenna system 13 is independently corrected using the satellite attitude control system. The receive antenna position errors are similarly detected by switching the beacon signal via switch terminal 43a (as illustrated by dashed line in FIG. 3) to the receive antenna system for transmitting the beacon signal as spot beams via the receive antenna 13 and by comparing the transmitted signal as spot beams via the receive antenna 13 to both the CONUS horn 15 and the CONUS horn "calibrate" signal in a manner similar to that described in connection with the transmit antenna. Again, the four active trunking ground stations will send the detected signals and the central control station will measure the ratio between the beacon signals received sequentially via the CONUS beam and the communications received antenna spot beams and these four signals are processed at a computer in central control station 30 according to an estimation algorithm to produce correction signals for roll and pitch that can be transmitted to the satellite via either the receive antenna 13 or the omni antenna 34 to the command receiver CR&T 100. In the receive antenna system 13 correction case, however, the attitude control system 50 of the spacecraft is energized, and attitude control system 50 changes the attitude of the spacecraft to correct for the receive antenna error in pitch and roll. Attitude correction can be accomplished using thrusters 51 for example or using magnetic torquing as described by L. Muhlfelder et al. in U.S. Pat. No. 4,062,509. Although switches were used in the illustration of FIG. 3, PIN diodes and PIN diode drivers and logic circuits may be used to provide the switching between the calibrate and the CONUS, receiver and transmitter horns with the power from each of the horns being power divided and split equally to the four trunking horn antennas associated with stations 21, 23, 24 and 26 in a manner well known in the state of the art.

Figure 4:
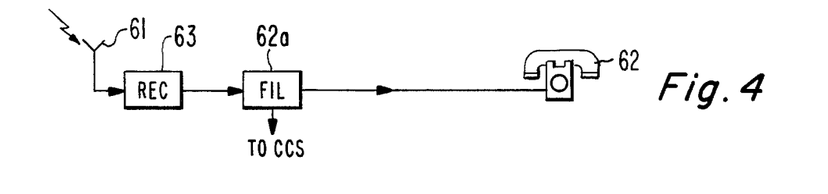
FIG. 4 is a block diagram of one ground station and FIG. 4 is a block diagram of the central control station.
Figure 4A:
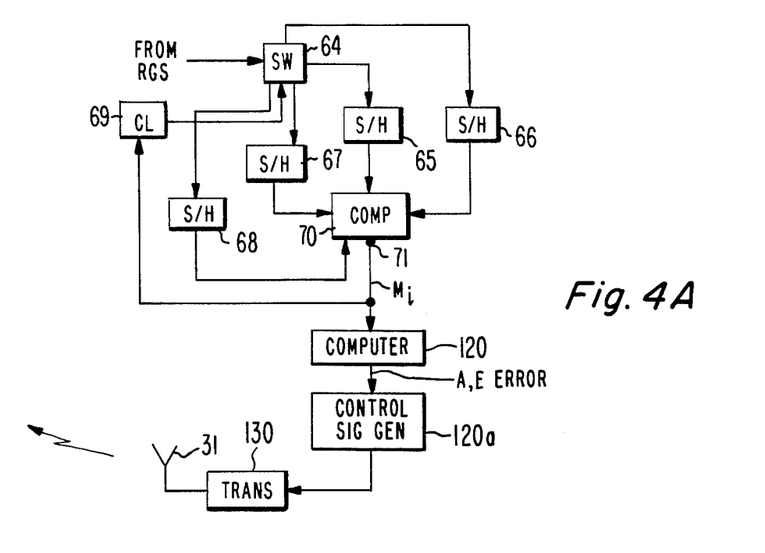

Referring to FIG. 4 there is illustrated in block diagram form an example of a receiver ground station (RGS) for providing the beacon signals. The received communications from the satellite would be picked up from antenna 61 and applied to receiver 63. These communication signals would be passed on to a final utilization device such as a telephone 62. The beacon signals transmitted sequentially from the CONUS horn 15, the transmit antenna systems 11 and receive antenna system 13 of the satellite 10 would be received at antenna 61 and applied to receiver 63. These detected beacon signals from receiver 63 are separated from the communication signal by filter 62a and are then sent from each of the receiver ground stations (RGS) 21, 23, 24 and 26 via a narrow band link such as a telephone line to the central control station (CCS) 30 where they are sequentially coupled to sample and hold circuits 65, 66, 67 and 68 as shown in FIG. 4A. The beacon signal radiated from the CONUS antenna horn 15 of the satellite without passing through attenuator 42 would be applied first to sample and hold circuit 65, for example, and the beacon signals radiated from the CONUS horn 15 coupled through the 3 db attenuation would be picked up and applied to sample and hold circuit 66. In the next sequence of events the beacon signal from the transmit antenna would be coupled to sample and hold circuit 67. These beacon signals would be compared at comparator 70 to produce a first output signal ($M_i$ for example) which would represent the ratio between the signals received sequentially from the CONUS beam and the transmit antenna spot beam where the CONUS signal is calibrated relative to the 3 db calibration signal. The next beacon signal received in the proper timing sequence would be applied to the sample and hold circuit 68 and will represent the signal transmitted via the satellite receive antenna system and this would be compared at comparator 70 to the CONUS beam to produce a signal proportional to the ratio of the CONUS and the receive antenna spot beam at terminal 71. The whole sequence to the sample and hold circuits will be controlled via switch 64 and clock 69, synchronized with that of the satellite 10, and with unequal switching periods in order for the clock 69 to differentiate at the output of the comparator the two beacon transmissions from the horn antenna 15 and the beacon transmission from the transmit antenna 11 and receive antenna 13 and to differentiate the remote ground stations.

These ratio signals ($M_i$) provided from the comparator 70 are processed by computer 120 to produce satellite attitude control signals to correct for receive antenna pointing errors and to produce pitch and roll step motor control signals to correct for the transmit antenna pointing errors. The computer 120 processes the measured ratio signals $M_i$ from each of the several ground stations and based on stored individual sensitivities for each station calculates the roll, pitch and yaw errors of the respective transmit or receive antenna. From these roll, pitch and yaw errors, control signals are generated at signal generator 120a to correct for antenna pointing errors. The control signal generator may be part of computer 120. These control signals are transmitted to the satellite for example via the command transmitter 130 and antenna 31. Alternatively, these ground stations 21, 23, 24 and 26 may be coupled via a microwave relay link to the central control ground station 30. In another embodiment the ratio signals may be derived at each of the ground stations and these are relayed via the satellite to the central ground station 30 where the correction signals are derived and sent to the satellite. In still another embodiment the ratio signals at the ground stations are sent to and processed at the satellite to derive the necessary antenna pointing signals by an on-board computer.

In this later arrangement either the receive antenna system 13 or the omni antenna 34 receive the ratio signals directly from the peripheral ground stations 21, 23, 24 and 26. These ratio signals are transmitted for example with a ground station identifier code. The command receiver 39 includes for this example a computer and means for tagging the ratio signals and via the computer processing these signals according to an algorithm to determine if there are pointing errors and if so producing the control signals to correct the pointing errors.

The composite antenna beam pointing error is determined by an RSS (Root Sum Square) of the basic spot beam error and the error contributed by the satellite attitude control system. The basic spot beam error is a function of the error in measurement of the CONUS beam signal ratio and the spot beam antenna pattern. Further, the error in measurement of the CONUS beam signal ratio is the combination of errors due to (1) received signal/noise ratios, (2) measurement equipment uncertainty and (3) CONUS horn effects (beam slope times angular uncertainty). Analyses conducted incorporating all the above considerations show expected $3\sigma$ error values of $\pm 0.043°$ for pitch and $\pm 0.046°$ for roll at each of the ground based active trunking (measurement) ground stations. The overall system pointing accuracy determined at the central control station is improved when based on computations using the (typically) four data points and a smoothing algorithm.

The locations for the ground stations used provide a diversity of measurements of pitch, roll, and yaw motion of the communication antenna pattern. The data base for each ground station is obtained from the nominal (predicted or measured) spacecraft antenna pattern data. The data required for each station consist of:

1. The nominal ratio measurement for the station.

2. The nominal azimuth A and elevation E coordinates of the station i relative to the spacecraft antenna pattern ($A_i$, $E_i$).

3. The vector gradient of the ratio measurement $M_i$ in terms of azimuth and elevation components ($\partial M_i/\partial A \times \partial M_i/\partial E$). Measurement, here, refers to measured ratio of signal received from communications antenna to the signal received from the CONUS coverage reference antenna (horn).

From these data, the sensitivities of each station measurement to spacecraft yaw, roll, and pitch attitude errors are defined as follows:

$$\text{yaw:} \frac{\partial M_i}{\partial \psi} = -\left[\left(\frac{\sin(E_i)}{\cos(E_i)}\right) \cdot \frac{\partial M_i}{\partial A}\right] + (\sin(A_i)) \cdot \frac{\partial M_i}{\partial E}$$

$$\text{roll:} \frac{\partial M_i}{\partial \phi} = \left[\left(\frac{\sin(E_i)}{\cos(E_i)}\right)(\sin(A_i)) \cdot \frac{\partial M_i}{\partial A}\right] - \frac{\partial M_i}{\partial E}$$

$$\text{Pitch:} \frac{\partial M_i}{\partial \theta} = -\frac{\partial M_i}{\partial A}.$$

In practice only roll and pitch are needed, since yaw errors are not corrected.

The resulting roll and pitch sensitivities constitute a sensitivity matrix A, containing a row for each station to be used and two columns (roll and pitch). The measurement, M, could in principle be predicted from the attitude errors X, as follows:

$$M = [A]X$$

The solution of this equation is the least-squares estimate of the attitude errors that caused the actual measurement:

$$X = ([A]^T[A])^{-1}[A]^T M$$

This procedure is similar to procedures used in reducing tracking data for ephemeris determination, although in the present case only a small set of equations (4 to 6) need be solved. The Perkin-Elmer 3220 would require less than 5 milliseconds for this solution.

Figure 5:
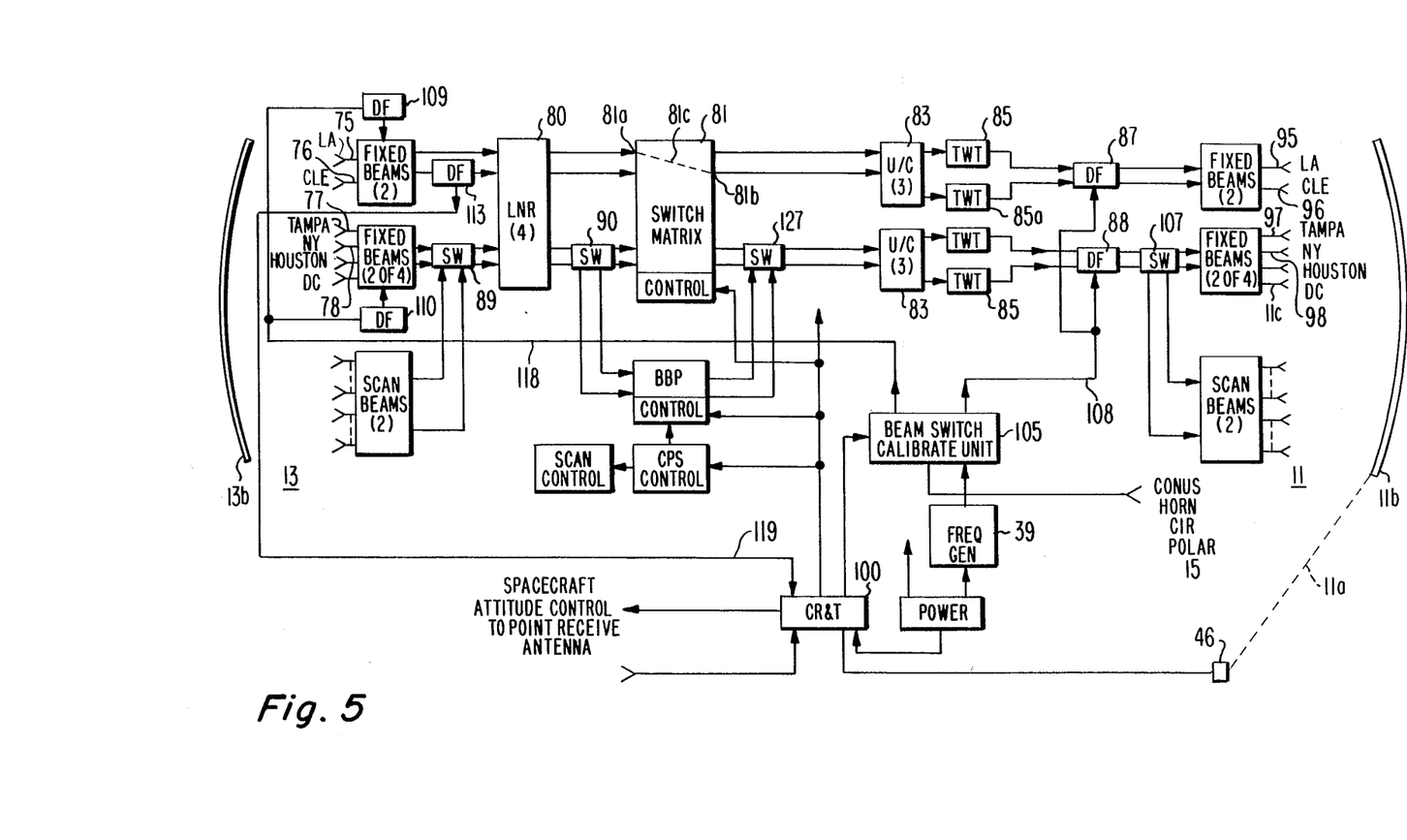
FIG. 5 is a more detailed functional block diagram of the satellite system according to one embodiment of the present invention.

Referring to FIG. 5 there is illustrated an overall simplified block diagram of the satellite commmunication system. Transmissions from the ground trunking or ground stations are received by the receive antenna system 13. The horn antennas 75, 76, 77 and 78, for example, represent the Los Angeles, Cleveland, Tampa and New York receive antenna elements on the satellite which are, for example, trunking stations. These up-link signals are, for example, in the 28–30 gigahertz frequency range and are applied to a low noise receiver 80 where the signals are received and down converted to an IF frequency somewhere in the range of 3 to 4 gigahertz, for example. The signals from the Tampa and New York antenna elements 77 and 78 are applied via switching network 89 to the low noise receiver 80. Spot beams from other locations may be selectively switched to the low noise receiver as indicated in the figure to provide communications from other ground stations. Signals from the low noise receiver 80 are applied to a switching matrix 81 where, in accordance with sychronization control signals received at the spacecraft via the telemetry subsystem 100 (CR&T), certain input-/output switch routing is provided. For example, at a given moment signals received via Los Angeles antenna element 75 may be routed as indicated by dashed line 81c for transmission to Cleveland transmit antenna element 96. The output signals from the switching matrix 81 are applied and up converted to 18 to 19 gigahertz, for example by up converters 83, amplified by TWT amplifiers 85 and applied via directional filters 87 and 88 to the transmit antenna 11 via, for example, horns 95, 96, 97 and 98. For example, the signals from Los Angeles receive antenna element 75 are routed in the matrix 81 from the Los Angeles input at terminal 81a to terminal 81b of matrix 81 and converted at converter 83 and is applied to the Cleveland transmit antenna element 96 via TWT amplifier 85a and directional filter 87. In a similar manner, various beams from other ground stations may be converted and routed via the switches 89, 90, 101 and 103 to other spot beams under control of the CR&T system as desired. Under control of the CR&T system 100 control signals are sent to the beam switching calibrate unit 105 which sequentially activates the switches 40, 41 and 43 (FIG. 3) and provides the beacon signals to the CONUS horn 15 as indicated in FIG. 2 and to apply beacon signals via lead 108 and via directional filters 87 and 88 to the transmit antenna elements 95, 96, 97 and 98 for example, or to the receive antenna via the directional filters 109 and 110 via lead 118. As mentioned previously the signals at the receive antenna can be used to apply the control signals for the satellite antennas and this may be done via the signal from the Cleveland element 76 via direction filter 113 which applies the control signals to the tracking and control telemetry system 100 of the satellite via lead 119. The signals from the tracking and control telemetry system 100 received from the ground can be applied to either the spacecraft attitude control system to point the receive antenna, or to the reflector pitch and roll adjustment to point the transmit antenna. In the alternative signals from the system 100 can be applied to step motors coupled to the receive antenna and the transmit antennas are adjusted by the attitude control system.

We claim:

1. A satellite antenna pointing system comprising:
   a satellite having spatially separated transmit and receive communication antenna systems and separate means responsive to transmit antenna pointing control signals and receive antenna pointing control signals for independently pointing said transmit and receive antenna systems, said transmit and receive antenna systems being adapted to provide selective radiation patterns over an overall coverage region,
   said satellite further having means for generating a beacon signal,
   a broad coverage satellite antenna producing a radiation pattern coverage area on earth including and greater than that of said overall coverage region,
   means at said satellite for sequentially applying said beacon signal to said broad coverage antenna, said transmit antenna system and said receive antenna system,
   a plurality of peripheral ground stations located near the periphery of said overall coverage region and at the position of the desired patterns, each of said ground stations adapted to receive said beacon signals,
   means for comparing said beacon signals from said broad coverage antenna and said transmit antenna systems for producing a first signal and means for comparing said beacon signals from said broad coverage antenna and said receive antenna system for producing a second signal, means responsive to said first signals from said plurality of peripheral ground stations for producing said first transmit antenna pointing control signal and responsive to said second signals from said plurality of peripheral ground stations for providing said receive antenna pointing control signals, and means for applying said transmit antenna pointing control signal and said receive antenna pointing control signal to said separate pointing means at said satellite for independently pointing said transmit and receive antenna systems.

2. The combination of claim 1 wherein said means for producing said first transmit antenna pointing control signals and for producing said receive antenna pointing control signals includes:

a central ground station coupled to said peripheral ground stations and responsive to said first and second signals according to an algorithm to produce said receive antenna pointing control signal and said transmit antenna pointing control signals.

3. The combination of claim 2 wherein said central ground station is coupled to said peripheral ground stations via land lines.

4. The combination of claim 1 wherein said means for producing said first transmit antenna pointing control signals and for producing said receive antenna pointing control signals includes:

said satellite having an on-board computer and means coupled to said computer and responsive to said first and second signals sent from said peripheral ground stations for processing same according to a given algorithm.

5. The combination of claim 1 wherein said transmit and receive antenna systems are adapted to provide selected spot beam patterns within said overall coverage region.

6. The combination of claim 1 wherein said separate means for independently pointing said transmit and receive antenna systems includes step motors for controlling the pointing of the transmit antenna system and the attitude control system of the spacecraft for controlling the pointing of the receive antenna system.

7. The combination of claim 1 wherein said means for comparing said beacon signals from said broad coverage antenna and said satellite transmit antenna includes means responsive to said signals from said broad coverage antenna and said transmit antenna system for providing as said first signal a signal proportional to the ratio of said signals, and means for comparing said beacon signals from said broad coverage antenna and said satellite receive antenna includes means for providing as said second signal a signal proportional to the ratio of said receive broad coverage antenna signal and said satellite receive antenna system signal.

8. The combination of claim 1 wherein said means for applying said transmit antenna control signal and said receive antenna control signals includes the command and telemetry system of said satellite.

9. The combination of claim 1 wherein said means for sequentially applying said beacon signal includes switch means for sequentially applying said signal from said generating means to said broad coverage antenna, said transmit antenna system, and said receive antenna system.

10. The combination of claim 9 wherein said means for sequentially applying said beacon signal includes telemetry and control system of the spacecraft.

11. A method for pointing separated transmit and receive communication antenna systems comprising the steps of:

generating a beacon signal at said satellite, radiating said beacon signal sequentially from said satellite transmit communications antenna system, said receive communication antenna system and a broad coverage antenna that produces a radiation pattern coverage area on the earth including and greater than that provided by the overall coverage region of said transmit and receive antenna systems, receiving said beacon signals from said transmit and receive communications antenna systems and said broad coverage antenna at locations near the periphery of the overall coverage region, processing said received beacon signals to provide a first signal proportional to the ratio of said beacon signals from said transmit communications antenna and said broad coverage antenna and to provide a second signal proportional to the ratio of the signals from said receive communications antenna system and said broad coverage antenna, computing a transmit control signal from said first signals from said peripheral receiving locations, computing a receive control signal from said second signals from said peripheral receiving locations, and separately pointing said transmit and receive antenna systems in response to said separate transmit and receive control signals.

12. The method of claim 11 wherein said step of computing said transmit control signal includes comparing said first signals from said peripheral locations to each other and to a reference to detect an error in the positioning of said transmit antenna system and providing an error signal proportional to that difference.

13. A satellite antenna pointing system for use with a system of ground stations distributed over an overall coverage region where some of the ground stations are located near the periphery of the coverage region and are connected together to a central control station which uses the signals received at the peripheral ground stations to determine the transmit and receive pointing errors and provides control signals to the satellite, said satellite comprising:

separate transmit and receive communication antenna systems, said transmit communication antenna system including means for independently pointing said transmit antenna system and said receive antenna system, a broad coverage antenna adapted to provide a radiation coverage area on earth including and greater than said overall coverage region provided by said transmit and receive communication antenna systems, means for generating a beacon signal, means for sequentially applying said beacon signal to said broad coverage antenna, said transmit antenna system and said receive antenna system, whereby said peripheral ground stations sequentially receive said beacon signals and at said central control station said signals are compared and separate transmit and receive control signals are generated and sent to said satellite, and means at said satellite responsive to said transmit antenna control signals for independently pointing said transmit antenna system relative to said receive antenna and responsive to said receive antenna control signal for independently controlling the orientation or pointing of said receive antenna system.

14. The combination of claim 10 wherein said means for independently pointing said transmit antennas includes a step motor control system for controlling the position of said transmit antenna and said means for pointing said receive antenna systems includes said satellite attitude control system responsive to said receive control signal for changing the attitude of said satellite.

* * * * *

UNITED STATES PATENT AND TRADEMARK OFFICE
CERTIFICATE OF CORRECTION

PATENT NO. : 4,599,619

DATED : July 8, 1986

INVENTOR(S) : John Edward Keigler et al.

It is certified that error appears in the above-identified patent and that said Letters Patent is hereby corrected as shown below:

Column 10, line 56 after "radiation" insert --pattern--.

Signed and Sealed this

Twenty-first Day of October, 1986

[SEAL]

*Attest:*

DONALD J. QUIGG

*Attesting Officer*  *Commissioner of Patents and Trademarks*